United States Patent [19]

Takahashi et al.

[11] Patent Number: 4,984,104

[45] Date of Patent: Jan. 8, 1991

[54] APPARATUS FOR RECORDING AN INFORMAGION SIGNAL AT A SECOND PART OF A GIVEN TRACK BY SAMPLING AND HOLDING A TRACKING CONTROL SIGNAL USED FOR TRACKING AT A FIRST PART OF THE GIVEN TRACK

[75] Inventors: Takao Takahashi, Tokyo; Kenji Nakano, Kanagawa, both of Japan

[73] Assignee: Sony Corporation, Tokyo, Japan

[21] Appl. No.: 480,363

[22] Filed: Feb. 5, 1990

Related U.S. Application Data

[63] Continuation of Ser. No. 257,136, Oct. 14, 1988, abandoned, which is a continuation of Ser. No. 901,955, Aug. 29, 1986, abandoned.

[30] Foreign Application Priority Data

Aug. 30, 1985 [JP] Japan .................................. 60-191728

[51] Int. Cl.$^5$ ..................... G11B 5/584; G11B 15/467
[52] U.S. Cl. .................................. 360/77.14; 360/70; 360/57
[58] Field of Search ................... 360/77.14, 77.15, 70, 360/19.1, 64, 57, 84; 358/906

[56] References Cited

U.S. PATENT DOCUMENTS

| | | | |
|---|---|---|---|
| 4,306,261 | 12/1981 | Bergmans et al. | 360/70 |
| 4,509,083 | 4/1985 | Nakano | 360/77 |
| 4,542,419 | 9/1985 | Morio et al. | 360/19.1 |
| 4,558,382 | 12/1985 | Edakubo et al. | 360/77 |
| 4,573,089 | 2/1986 | Maeda et al. | 360/77 |

FOREIGN PATENT DOCUMENTS

| | | |
|---|---|---|
| 53508/73 | 10/1974 | Australia . |
| 0094207 | 11/1983 | European Pat. Off. . |
| 0102600 | 3/1984 | European Pat. Off. . |
| 59-042606 | 3/1984 | Japan . |
| 8302117 | 6/1983 | Netherlands . |

OTHER PUBLICATIONS

Patent Abstracts of Japan, vol. 8, No. 33 (P-254) 2/14/84, 58-188324.
Patent Abstracts of Japan, vol. 8, No. 183 (P-296) 8/23/84, 59-75452.
Patent Abstracts of Japan, vol. 9, No. 97 (P-352) 4/26/85, 59-221856.
IEEE International Conference on Consumer Electronics, Jun. 1985, pp. 50-51, Multi-Track PCM Audio Utilizing 8mm Video System, Itoh et al.

Primary Examiner—Aristotelis M. Psitos
Assistant Examiner—David L. Robertson
Attorney, Agent, or Firm—Hill, Van Santen, Steadman & Simpson

[57] ABSTRACT

An apparatus for recording an information signal on a track scanned by a rotary head on a record medium in which the track is divided into a plurality of areas. A pilot signal for tracking is recorded in a predetermined area on the track. A circuit is provided for reproducing the pilot signal for tracking from the predetermined area. Also, a circuit for recording the information signal on the track and a circuit for controlling the tracking of the rotary head by the predetermined pilot signal are provided.

4 Claims, 8 Drawing Sheets

APPARATUS FOR RECORDING AN INFORMAGION SIGNAL AT A SECOND PART OF A GIVEN TRACK BY SAMPLING AND HOLDING A TRACKING CONTROL SIGNAL USED FOR TRACKING AT A FIRST PART OF THE GIVEN TRACK

This is a continuation of application Ser. No. 257,136, filed Oct. 14, 1988, now abandoned, which is a continuation of application Ser. No. 901,955, filed Aug. 28, 1986, now abandoned.

RELATED APPLICATIONS

The present application is related to the following application owned by the same assignee: "Index Signal Detecting System", Takao Takahashi et al, Ser. No. 889,833, filed July 28, 1986 now U.S. Pat. No. 479,151.

BACKGROUND OF THE INVENTION

This invention relates to an apparatus for recording an information signal at each of a plurality of divided areas provided by dividing one track along the scanning direction of a rotary head. This occurs such as when an 8 mm video tape recorder is exclusively used as an apparatus for recording and/or reproducing a PCM (pulse-code-modulated) audio signal. A pilot signal is recorded and/or reproduced for tracking. This pilot signal is used in the reproducing mode by a rotary head when the pilot signal for tracking is superimposed upon the information signal.

The 8 mm video tape recorder can operate in a recording mode in which an audio signal is frequency-modulated, and is mixed with a color video signal so as to be separable from the color video signal and then can be recorded. In an additional optional mode, this audio signal is pulse-code-modulated and recorded in an area separate from that of the color video signal, and one track is formed by both the PCM audio signal and the color video signal.

Figure 1:
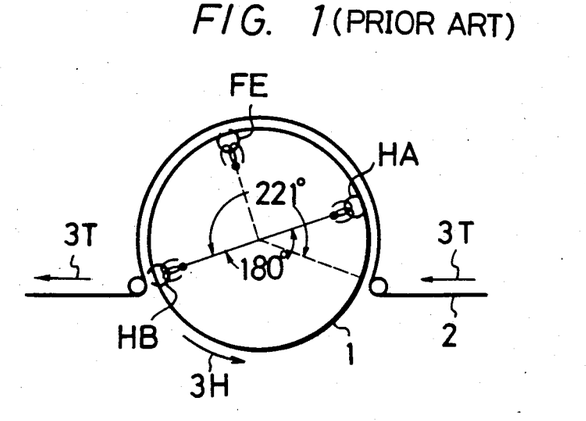
FIG. 1 is a diagram showing one example of a rotary head assembly of an 8 mm video tape recorder to which the present invention is applied.
Figure 2:
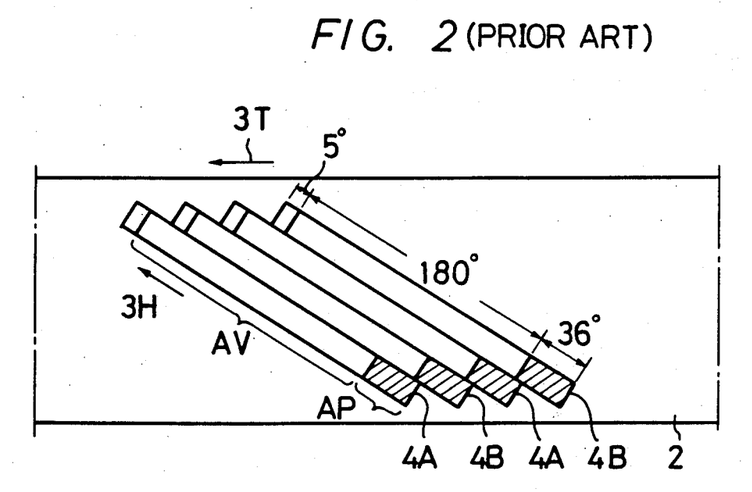
FIG. 2 is a diagram showing one example of a recording track pattern formed by the 8 mm video tape recorder.

FIG. 1 shows one example of a rotary head assembly of the 8 mm video tape recorder, and FIG. 2 the tape format thereof according to the prior art.

In FIG. 1, reference letters HA and HB represent record and reproduce rotary magnetic heads. These record and reproduce rotary magnetic heads are made different in the azimuth angles of their recording gaps, and are mounted at an angular spacing of 180° on the periphery of a rotary drum 1 so as to slightly project from the peripheral surface of the rotary drum 1.

The rotary magnetic heads HA and HB are rotated at a frame frequency (30 Hz) in the direction shown by an arrow 3H. A magnetic tape 2 is wrapped around the periphery of the drum 1 over an angular spacing of more than 221°, and is transported at a constant speed in the direction shown by arrows 3T.

Accordingly, on the tape 2, there are alternately formed by rotary heads HA and HB tracks 4A and 4B 221° long to thereby record the signal as shown in FIG. 2. On the tracks 4A and 4B, in an area AP having an angular range of about 36° (including a margin for recording the PCM audio signal in the so-called after-recording mode and a guard band area), there is recorded a PCM audio signal with a compressed time base associated with one field period of the video signal. In a next area having an angular range of 180°, there are recorded a color video signal of one field period, an FM audio signal, and a pilot signal for tracking. The remaining area having an angular range of 5° is assigned as a spare period for the time when the head is detached from the magnetic tape 2.

As described above, the 8mm video tape recorder is capable of recording and/or reproducing the PCM audio signal. So, in view of the above mentioned aspect, a technique has been proposed for enabling the 8mm video tape recorder to be used as a PCM audio signal recording and/or reproducing apparatus by using a color video signal recording area AV as a PCM audio signal recording area (see U.S. patent application, Ser. No. 463,337, filed on Feb. 2, 1983, incorporated herein by reference).

Figure 3:
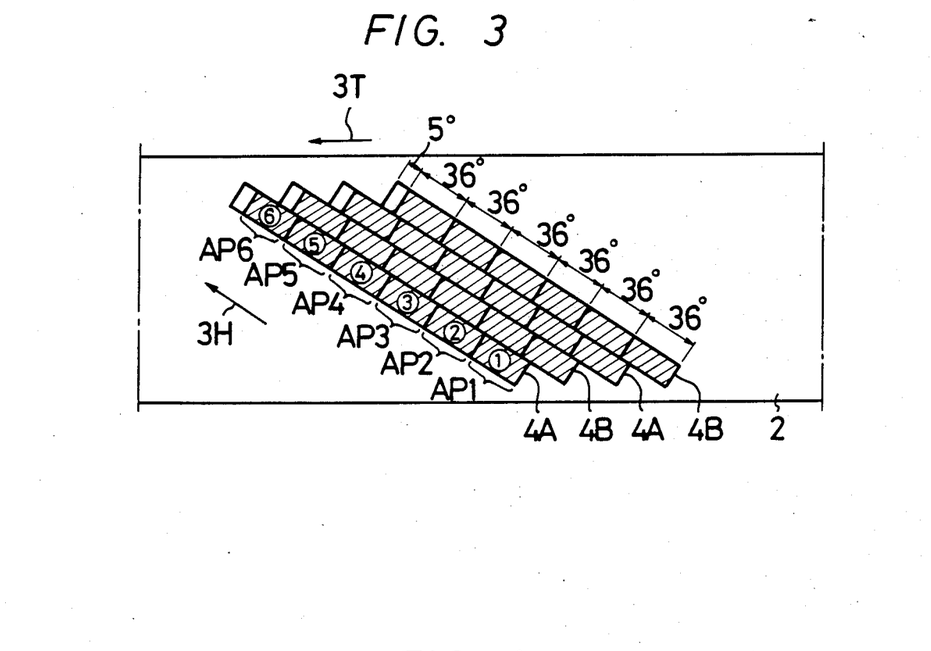
FIG. 3 is a diagram of one example of a recording track pattern formed by the 8 mm video tape recorder when it is used in a multi-PCM mode.

Specifically, the area AV having the angular spacing of 180° in which the video signal and the like are recorded is five times as long as the PCM area AP having the angular spacing of 36°. So, by equally dividing the area AV by 5, there are provided 5 divided track areas AP2 to AP6 shown by ② to ⑥ per track 4A, in addition to the original PCM audio signal track area AP1 indicated by ① as shown in FIG. 3. Then, the PCM audio signal of one channel, that is the audio signal of one field period which is pulse-code-modulated and time-base-compressed, is recorded on and/or reproduced from each of 6 divided track areas AP1 to AP6.

Therefore, in this case, since the audio signal of one channel can be recorded and/or reproduced at the unit of each area, the audio signal of 6 channels can be recorded and/or reproduced, making the recording time (capacity) 6 times as long as that in the prior art (this technique will be hereinafter referred to as a multi-PCM).

It is sufficient that a PCM processor to be used in the multi-PCM can be a one channel processor that is used by the conventional 8 mm video tape recorder, because the recording and/or reproducing is carried out at each divided track area. In this case, the pilot signal for tracking is recorded and/or reproduced at each divided track area (see Japanese Laid Open Patent Application No. 59-43682).

Figure 4:
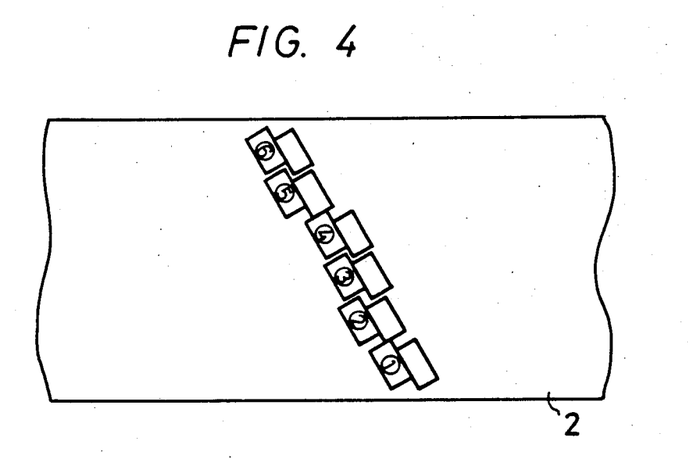
FIG. 4 is a diagram of one example of a recording track pattern formed in a multi-PCM mode used to explain defects encountered.

As described above, in the multi-PCM mode, the pilot signal for tracking is recorded and/or reproduced at the unit of each divided track area so that the recording tracks from the channels ① to ⑥ are rarely aligned rectilineally along the scanning direction of the rotary head as shown in FIG. 3, but are arranged arbitrarily as shown in FIG. 4.

If the recording and/or reproducing is carried out at the unit of each divided track area, that is, at the channel unit, it is not necessary that the divided recording tracks be aligned as shown in FIG. 3.

In order to reproduce a slave tape by using a recorded tape as a master tape, there is known a method in which the modulated signal recorded is then picked up by the rotary head and recorded on the slave tape without being demodulated, to thereby carry out the high speed dubbing operation. This high speed dubbing method does not require a demodulation, but only requires a master tape on which the signal was recorded in a given recording pattern.

Therefore, if it is possible that the signals from the tracks ① to ⑥ on a track are reproduced by one scanning of the rotary head, and the reproduced signals are recorded similarly on the slave tape. Thus, the dubbing can be carried out with good efficiency. For this purpose, the divided recording tracks must be aligned along the scanning direction of the rotary head.

Furthermore, since the exclusive PCM audio signal recording and/or reproducing apparatus is capable of recording the signals of multi-channels, a mode is possible, where the sound of each of the respective musical instruments in the orchestra, for example, is separately recorded on each of the channels. Upon reproducing, the recorded signals of 6 channels are simultaneously reproduced as if the respective musical instruments were played in concert. In this case, the tracks each having 6 channels must be aligned along the scanning direction of the rotary head.

SUMMARY OF THE INVENTION

It is an object of this invention to provide an improved apparatus for recording an information signal.

It is another object of this invention to provide an apparatus for recording an information signal at every arbitrary channel.

It is a further object of this invention to provide an apparatus for recording an information signal in which a plurality of divided recording tracks can be aligned rectilineally along the scanning direction of the rotary head.

It is a still further object of this invention to provide an apparatus for recording an information signal which can be suitably applied to the so-called 8 mm video tape recorder.

It is yet a further object of this invention to provide an apparatus for recording an information signal which can be suitably applied to the 8 mm video tape recorder when it is operated in the multi-PCM mode.

According to one aspect of the present invention, there is provided an apparatus in which a track is divided into a plurality of tracks along the scanning direction of the rotary head. An information signal can be recorded and/or reproduced at the unit of each of the divided tracks, and a reproduced pilot signal for tracking can be recorded and/or reproduced by the rotary head when it is superimposed upon the information signal. In this case, while the tracking servo in the playback mode is effected by using a reproduced pilot signal from the divided area on which the recording was already made, the information signal is recorded in other divided areas. Since the rotary head scans the track under the condition that it correctly tracks the divided previously-recorded area, the recording tracks of other divided areas are located at the positions which are extended along the scanning direction of the rotary head, thus aligning recording tracks of the plurality of channels.

DESCRIPTION OF THE PREFERRED EMBODIMENTS

Referring to the drawings, embodiments of this invention will hereinafter be described in detail, in which case the above mentioned 8 mm video tape recorder is used in a multi-PCM mode.

Figure 5:
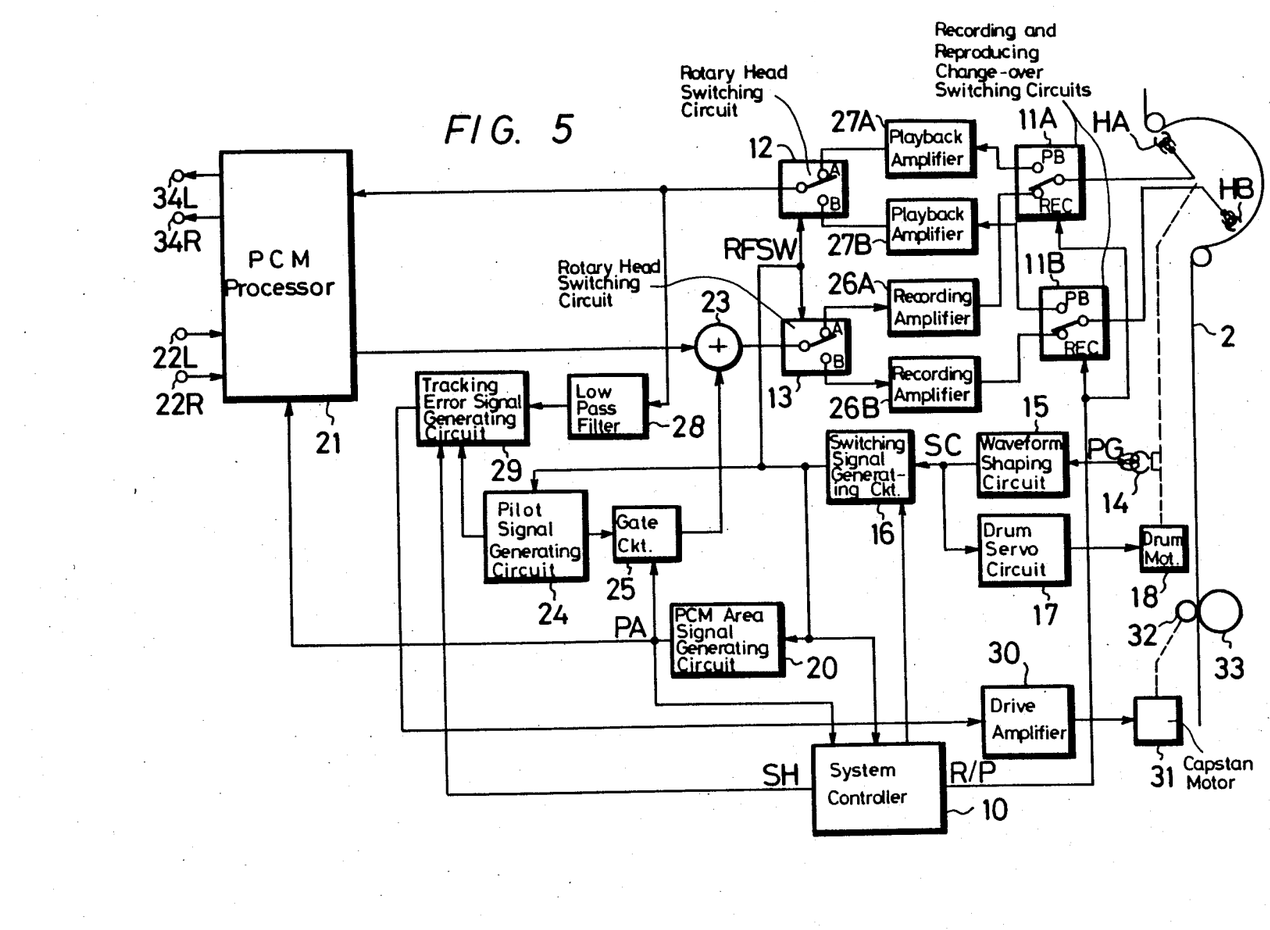
FIG. 5 is a block diagram showing an embodiment of an apparatus for recording an information signal according to the present invention.

FIG. 5 is a block diagram showing one embodiment of an apparatus for recording an information signal according to the present invention.

In FIG. 5, reference letters 11A and 11B respectively designate recording and reproducing change-over switching circuits. A recording and reproducing switching signal R/P from a system controller 10 is supplied to the switching circuits 11A and 11B, connecting the switching circuits 11A and 11B to their terminals REC upon recording and to the terminals PB upon reproducing.

Reference numeral 12 designates a switching circuit which changes-over the rotary heads upon reproducing. Reference numeral 13 designates a like switching circuit which changes-over the rotary heads upon recording. The switching circuits 12 and 13 are alternately connected to the illustrated position and to the opposite position in response to a switching signal RFSW at every ½ rotating period of the rotary heads HA and HB.

The switching signal RFSW is generated as follows. That is, there is provided a pulse generator 14 which is associated with the rotation of a drum motor 18. From this pulse generator 14, there is derived a pulse PG having a frequency of 30 Hz which indicates the absolute rotary phases of the rotary heads HA and HB. This pulse PG is supplied to a waveform shaping circuit 15 from which a square wave signal SC having a duty ratio of 50% is derived. This square wave signal SC is supplied to a drum servo circuit 17 as a reference signal for the drum phase servo. The output signal from the drum servo circuit 17 is supplied to the drum motor 18, controlling the rotary phase of the drum motor 18.

Further, the square wave signal SC is supplied to a switching signal generating circuit 16 and thereby the switching signal RFSW is generated. This switching signal RFSW is supplied to a PCM area signal generating circuit 20 which generates an area signal PA indicating an area in which the PCM audio signal is recorded and/or reproduced.

Figure 6A:
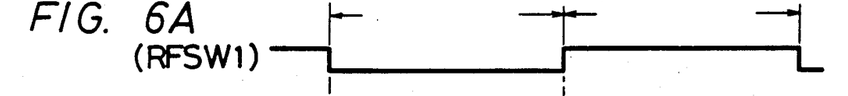
FIGS. 6A–6L, 7A–7D, and 8A–8M are respectively a timing chart, a diagram, and a timing chart used to explain the operation of the apparatus of the invention shown in FIG. 5.
Figure 6B:
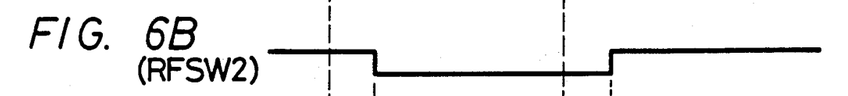
Figure 6C:
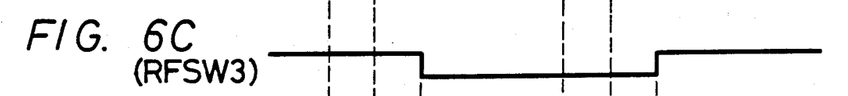
Figure 6D:
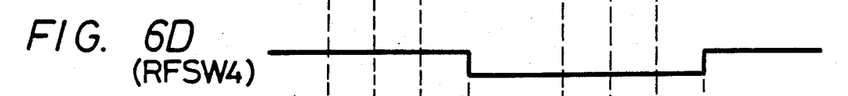
Figure 6E:
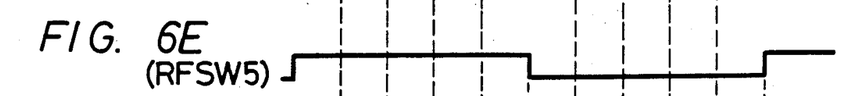
Figure 6F:
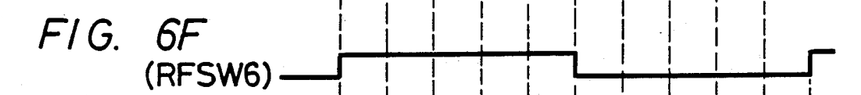
Figure 6G:
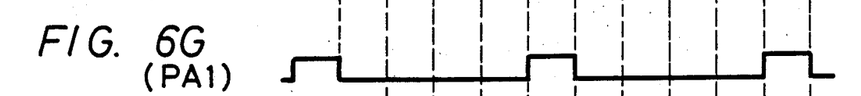

In the multi-PCM mode, when the PCM audio signal is recorded in the area AP1, the switching signal RFSW from the generating circuit 16 becomes a signal RFSW1. For example, it becomes "0" during a period in which the rotary head HA scans the area AV and "1" during a period in which the rotary head HB scans the area AV as shown in FIG. 6A. This is similar to the normal mode of the 8 mm video tape recorder using the track pattern shown in FIG. 2. The area signal PA, at that time, becomes a signal PA1 which is "1" during a period in which the rotary heads HA and HB scan the area AP1 as shown in FIG. 6G.

Figure 6H:
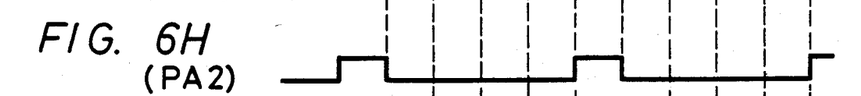
Figure 6I:
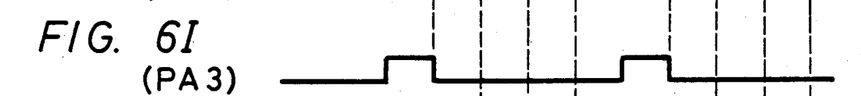
Figure 6J:
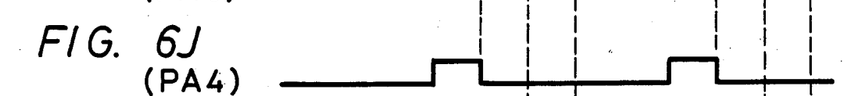
Figure 6K:
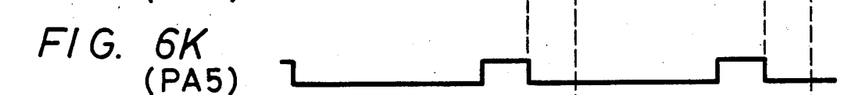
Figure 6L:
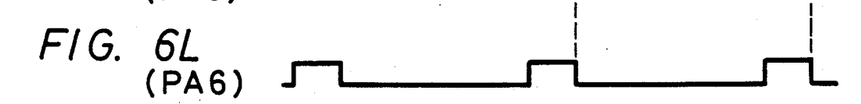

When the PCM audio signal is recorded in the area AP2, the switching signal RFSW and the area signal PA become a signal RFSW2 (FIG. 6B) and the signal PA2 (FIG. 6H) which result from phase-shifting the signals RFSW1 and PA1 by the rotation period of 36°, respectively. When the PCM audio signal is recorded in the area AP3, the signals RFSW and PA become signals RFSW3 and PA3 (FIGS. 6C and 6I), which result from phase-shifting the signals RFSW1 and PA1 by the period of 36°×2=72°. In like manner, when the PCM audio signal is recorded in the area AP4, the signals RFSW and PA become signals RFSW4 and PA4 (FIGS. 6D and 6J), which result from phase-shifting the signals RFSW1 and PA1 by the period of 36°×3=108°. When the PCM audio signal is recorded in the area AP5, the signals RFSW and PA become signals RFSW5 and PA5 (FIGS. 6E and 6K) which result from phase-shifting the signals RFSW1 and PA1 by the period of 36°×4=144°. When the PCM audio signal is recorded in the area AP6, the signals RFSW and PA become signals RFSW6 and PA6 (FIGS. 6F and 6L), which result from phase-shifting the signals RFSW and PA by the period of 36°×5=180°, respectively. These signals are obtained as the head switching signal RFSW and the area signal PA, respectively.

In the multi-PCM mode, it is determined by the instruction issued from the system controller 10 which area in the areas AP1 to AP6 is to be used, and the switching signal RFSW and the area signal PA of each area selected are generated from the switching signal generating circuit 16 and the PCM area signal generating circuit 20, respectively.

Then, the switching circuits 12 and 13 are connected to the terminals B in FIG. 5 during a period in which the switching signal RFSW is "0" and to the terminals A in FIG. 5 during a period in which it is "1", respectively. Further, the area signal PA is supplied to a PCM processor 21 which reads (upon recording) a signal from and/or writes (upon reproducing) a signal in a RAM (random access memory) provided in the PCM processor 21 during a period specified by this area signal PA.

A next description will be given on a case to produce, for example, a master tape for dubbing.

In this case, on an empty tape, the recording to the area AP2 is carried out first.

Specifically, the signal RFSW2 is generated as the switching signal RFSW, and the signal PA2 as the area signal PA. Furthermore, the switching circuits 11A and 11B are changed in position to the terminals REC in response to the recording and reproducing switching signal R/P from the system controller 10.

Then, left and right channel audio signals are supplied through input terminals 22L and 22R to the PCM processor 21 in which they are converted to PCM data. This PCM data is read out from the PCM processor 21 in response to the area signal PA2 during the period in which the rotary heads HA and HB scan the area AP2 on the tape 2. The PCM data thus read is supplied through an adder 23, the switching circuit 13, and a recording amplifier 26A or 26B to the rotary head HA or HB. Thus, the PCM data is written in the area AP2.

Figure 7A:
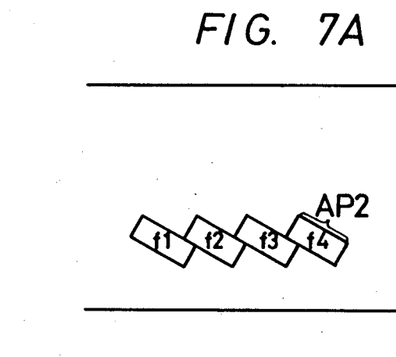

At that time, from a pilot signal generating circuit 24, there are derived pilot signals of 4 frequencies f1, f2, f3, and f4 ranging from 100 kHz to 200 kHz, under the condition that the signals of these frequencies f1 to f4 are cyclically sequentially changed at every track in response to the switching signals RFSW. The pilot signal thus derived is supplied through a gate circuit 25 to the adder 23 only during the period of the area signal PA. Accordingly, in the PCM audio track of the area AP2, there are recorded the pilot signals with frequencies f1 to f4 such that they are superimposed upon the PCM audio signal. Thus, the frequencies are changed cyclically at every track in sequence, as shown in FIG. 7A.

The playback of the PCM signal from the area AP2 thus recorded will be described.

In this playback mode, the switching signal RFSW and the area signal PA are the signals RFSW2 and PA2 in the recording mode.

The outputs from the rotary heads HA and HB are supplied through playback amplifiers 27A and 27B to the switching circuit 12. When the switching circuit 12 is changed in position in response to the switching signal RFSW2, the PCM audio signal from the area AP2 is supplied to the PCM processor 21 and thereby demodulated. Then the PCM signal of this area is written in the RAM of this PCM processor 21 in response to the area signal PA2, corrected for error, etc., and then is reconverted to left and right channel analog audio signals, which are fed to output terminals 34L and 34R. In this playback mode, the reproduced output from the switching circuit 12 is also supplied to a low pass filter 28 which filters out the pilot signal. This pilot signal is supplied to a tracking error signal generating circuit 29. On the other hand, from the pilot signal generating circuit 24, the pilot signals of 4 frequencies are supplied to the tracking error signal generating circuit 29 under the state that the pilot signals of 4 frequencies are switched at every track in response to the switching signal RFSW. Then, in the tracking error signal generating circuit 29, as is well known, the reproduced pilot signals and the reference pilot signals from the pilot signal generating circuit 24 are compared to thereby generate the tracking error signal. In this case, since the tracking error signal is generated from the tracking error signal generating circuit 29 only during the period of the area AP2, a sample and hold signal SH formed on the basis of the area signal PA is supplied from the system controller 10 to the tracking error signal generating circuit 29, which samples and holds the tracking error signal of the area AP2. The tracking error signal sampled and held is supplied through a drive amplifier 30 to a motor 31 for a capstan 32 chich controls the movement of the magnetic tape 2. Thus, the rotary heads HA and HB are controlled so as to correctly track the recording tracks of the area AP2. Reference numeral 33 designates a pinch roller which presses the magnetic tape 2 against the capstan 32 so as to move the magnetic tape 2.

After the recording is carried out in the area AP2 as described above, if it is required to record the PCM signal in another area, for example, the area AP6, the area AP6 is specified as such a recording area by the system controller 10.

Figure 8A:
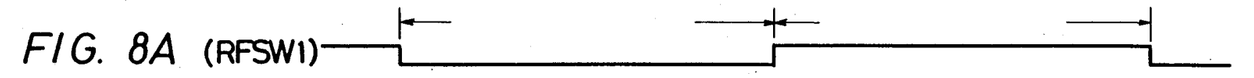
Figure 8B:
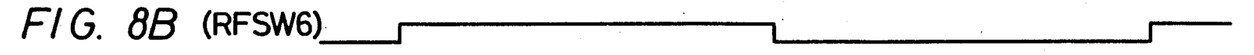
Figures 8C, 8D:
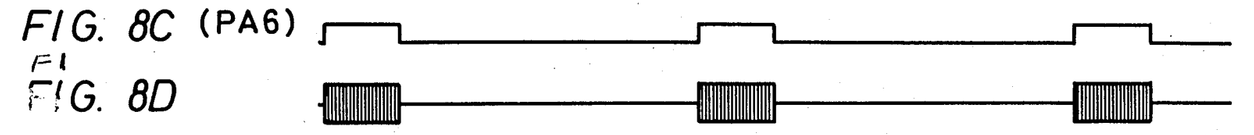
Figure 8E:
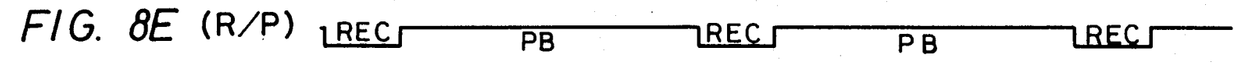
Figure 8F:
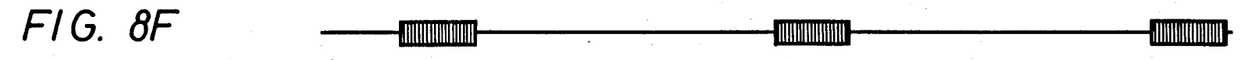

Then, the switching signal RFSW becomes a signal RFSW6 (FIG. 8B) and the area signal PA becomes a signal PA6 (FIG. 8C). Accordingly, during the period in which this signal PA6 becomes "1", the PCM signal is read out from the RAM provided in the PCM processor 21 as shown in FIG. 8D, and then is recorded in the area AP6. At that time, the recording and reproducing switching signal R/P from the system controller 10 becomes "0" only during the period in which the heads HA and HB scan the area AP6 as shown in FIG. 8E, connecting the switching circuits 11A and 11B to the terminals REC with the result that the apparatus is placed in the recording mode. The switching circuits 11A and 11B are connected to the terminals PB during other periods, and thus the apparatus is set in the reproducing mode. Therefore, a mixed signal of the PCM signal and the pilot signal is reproduced from the previously-recorded area AP2 (see FIG. 8F). Then this mixed signal is supplied to the low pass filter 28, and thus the reproduced pilot signal is filtered out so that the tracking error signal is generated in the tracking error signal generating circuit 29.

Figure 7B:
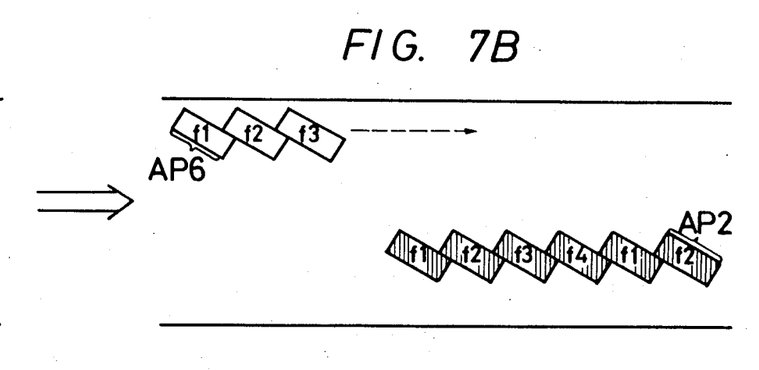
Figure 8G:
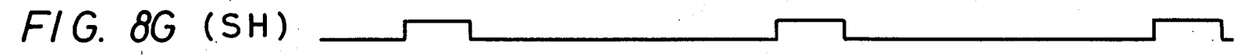

At that time, a sample and hold signal SH, which becomes "1" during the period of the area AP2 (FIG. 8G), is derived from the system controller 10, thus sampling and holding the afore-mentioned tracking error signal. The tracking error signal thus sampled and held is supplied through the drive amplifier 30 to the capstan drive motor 31 as earlier described. This effects the tracking servo. Consequently, while the tracking servo based on the reproduced signal from the area AP2 is being effected, the recording is carried out in the area AP6 as shown in FIG. 7B. As shown in the same figure, the recording tracks of the areas AP6 and AP2 are arranged at the extension of the scanning directions of the rotary heads.

In this case, the frequency of the pilot signal superimposed upon the recording signal on the area AP6 of each track is selected on the basis of the frequency of the reference pilot signal supplied to the tracking error signal generating circuit 29 with the result that the pilot signals which are of the same frequency are recorded in the areas AP2 and AP6 during a period in which the heads HA and HB scan the magnetic tape 2 one time.

When the PCM signal is to be recorded, for example, in the area AP5 as the third area, such an area is specified as the area AP5 by the system controller 10.

Figure 8H:
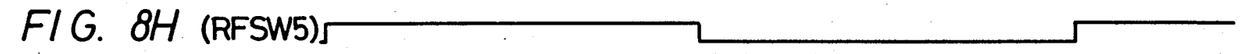
Figures 8I, 8J:
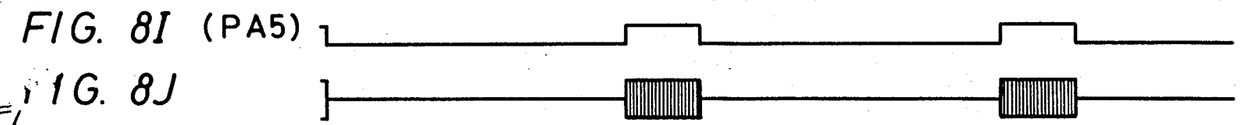
Figure 8K:
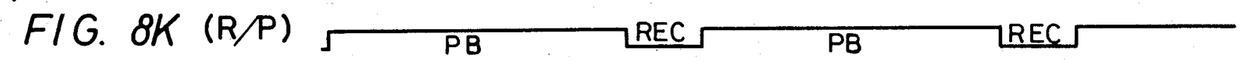

In this case, the switching signal RFSW becomes a signal RFSW5 (FIG. 8H), and the area signal PA becomes a signal PA5 (FIG. 8I). Then the recording and reproducing switching signal R/P from the system controller 10 becomes "0" only during the period of the area AP5 as shown in FIG. 8K. Thus, the apparatus is placed in the recording mode to thereby record a PCM signal with a time base compressed during this period as shown in FIG. 8J.

Figure 7C:
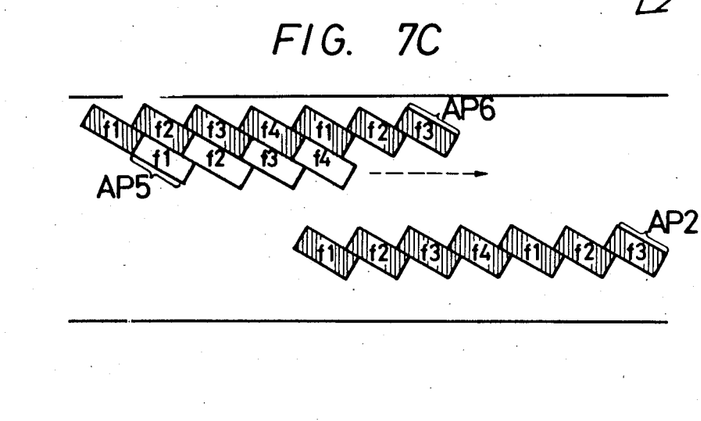
Figure 8L:
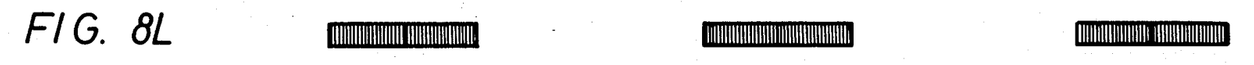
Figure 8M:
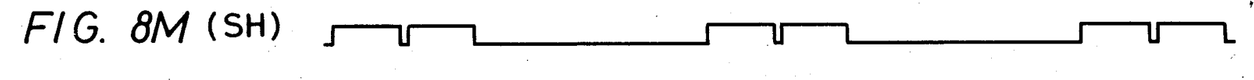

Upon recording in the area AP5, the recording was already carried out in the areas AP2 and AP6 on the magnetic tape 2 so that the reproduced signals are obtained from these areas AP2 and AP6 (FIG. 8L), and the reproduced pilot signals from the areas AP2 and AP6 are derived from the low pass filter 28 and then fed to the tracking error signal generating circuit 29. Then, from the system controller 10, there is derived a sample and hold signal SH (FIG. 8M) which becomes "1" during the periods corresponding to these areas AP2 and AP6. Thus, the tracking error signal generating circuit 29 generates a tracking error signal which is used to control the tracking with respect to the whole scanning period of the rotary heads HA and HB. In other words, the recording to the area AP5 is carried out, while the tracking servo based on the reproduced signals from the areas AP2 and AP6 is being carried out (see FIG. 7C). As a result, the tracks on the area AP5 are arranged rectilineally along the scanning direction of the rotary head together with the tracks on the areas AP2 and AP6.

Figure 7D:
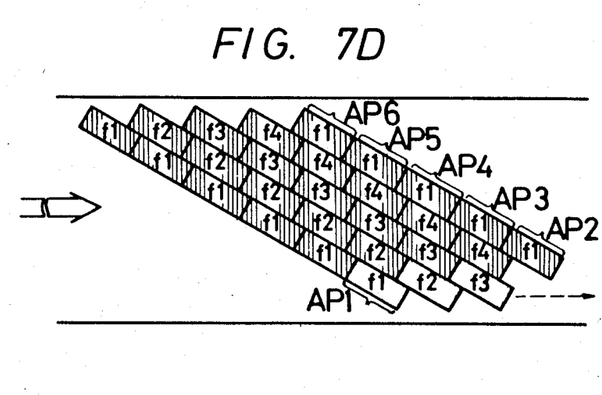

Similarly, the recording is sequentially carried out in the areas AP4, AP3, and AP1 in this order. Each recording is carried out while the tracking servo based on the reproduced pilot signals from other previously-recorded areas is being carried out. As a result, as shown in FIG. 7D, the tracks on the areas AP1 to AP6 are arranged rectilineally along the scanning direction of the rotary head.

Figure 9:
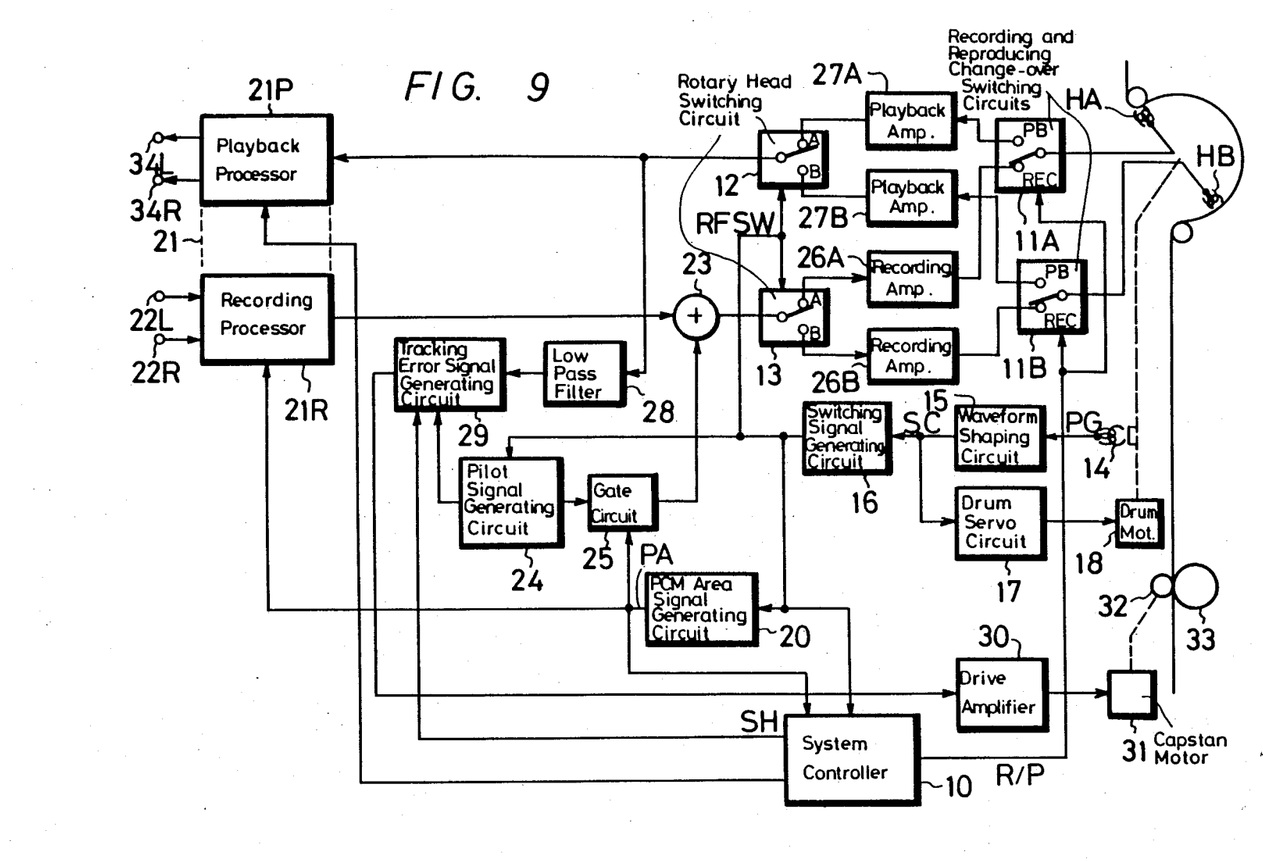
FIG. 9 is a block diagram showing another embodiment of the present invention.

Since in the first embodiment the master tape for dubbing is created when the recording is carried out in the other area, it is not necessary to match the synchronization of the signal to be recorded with that of the previously-recorded area, etc. However, when the sounds of the different musical instruments are recorded in the respective areas and the signals of 6 channels are all reproduced simultaneously as if the respective musical instruments were played in the concert, the recording must be carried out in the areas while checking the sounds reproduced from the previously-recorded areas. FIG. 9 is a block diagram showing another embodiment of the apparatus for recording an information signal according to the present invention. In this embodiment, the above-mentioned requirement is taken into consideration. In this case, the area signals are supplied separately to a PCM playback processor 21P and a PCM recording processor 21R in the PCM processor 21. In FIG. 9, like parts corresponding to those of FIG. 5 are marked with the same references and will not be described in detail.

Referring to FIG. 9, the area signal PA derived from the area signal generator 20 and used to specify the area in which the recording is carried out is supplied to the PCM recording processor 21R. Furthermore, after the recording is carried out in the area AP2, the system controller 10 generates a signal which always specifies this area AP2. This signal is fed to the PCM playback processor 21P.

Accordingly, the reproduced output of the area AP2 is always derived from the PCM playback processor 21P, so that while checking the sounds from this area AP2, the recording to the other area can be carried out.

By the way, in the case of the 8 mm video tape recorder, a rotary head is used as an erase head. This rotary erase head FE is located so that, as shown in FIG. 1, it precedes the head HA by the period of 90° in a rotation angle of the rotary head. The rotary erase head FE is formed wide enough in gap width to simultaneously erase both the tracks formed by the heads HA and HB by one scanning.

With the rotary heads thus arranged, when the recording area and an area from which the reproduced tracking servo signal is derived are spaced apart by 90° in a rotation angle of the rotary head, an erase signal enters via a rotary transformer to the reproduced signal as a crosstalk component. This disturbs the tracking servo.

Figure 10A:
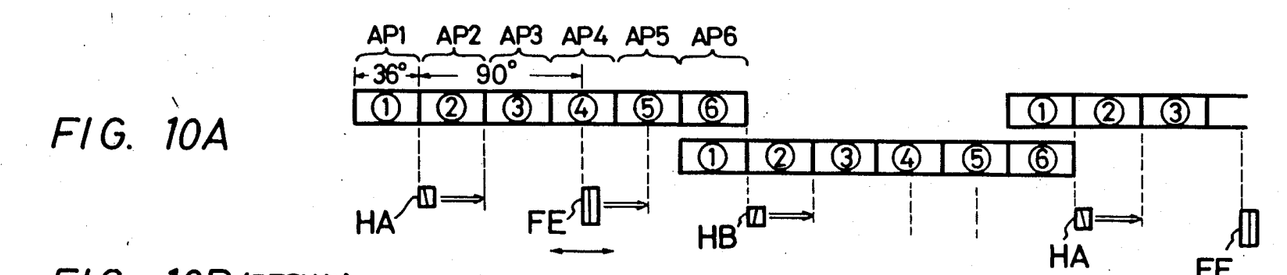
FIGS. 10A to 10I are timing charts respectively used to explain the operation of the apparatus shown in FIG. 9.

To be more concrete, let it be assumed that an area in which the recording is to be carried out is in the area AP4, and that an area from which the reproduced tracking error signal is to be derived is the area AP2. In this case, when the rotary head HA just starts scanning of the area AP2, the rotary erase head FE is located in the midst of the area AP4 in which the rotary erase head FE just finishes the scanning or erasing of the first half of the area AP4 as shown in FIG. 10A. As a result, when the rotary erase head FE erases the second half of the area AP4, the rotary head HA scans the first half of the area AP2 so that the erase signal is entered into the reproduced signal derived from the first half of the area AP2 as noise (see FIG. 10G).

When the rotary head HB scans the area AP2, the rotary erase head FE does not carry out the erase operation so that the reproduced output of the rotary head HB is not affected by the erase signal.

Figure 10B:
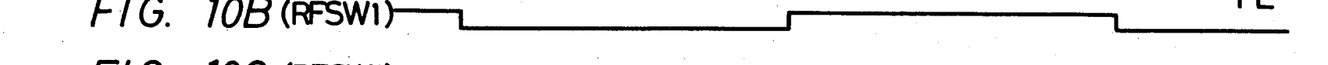
Figure 10C:
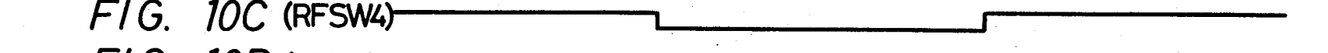
Figure 10D:
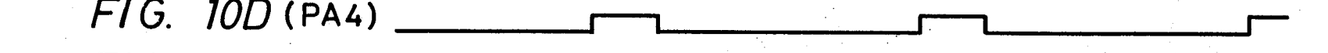
Figure 10E:
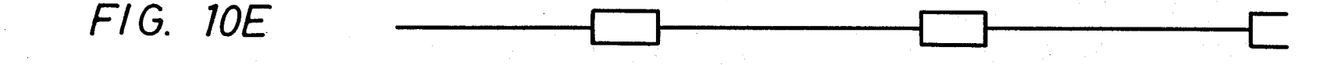
Figure 10F:
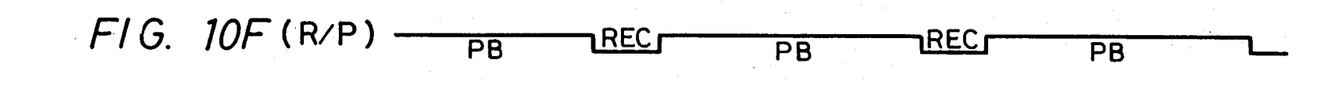
Figure 10G:
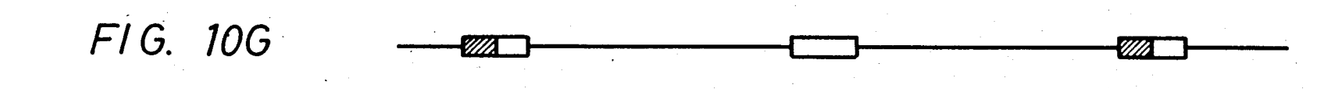
Figure 10H:
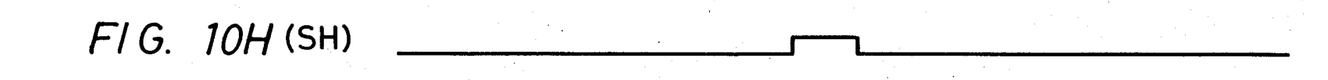
Figure 10I:
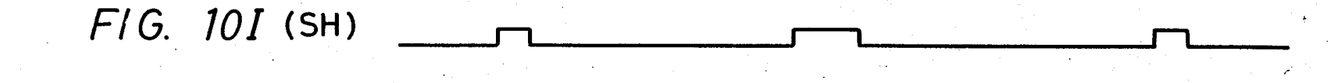

Therefore, in the embodiment shown in FIG. 9, the sample and hold signal SH supplied from the system controller 10 to the tracking error signal generating circuit 29 is formed as a signal with 2 field periods in which the rotary head HB scans the area AP2 (see FIG. 10H). Alternatively, as shown in FIG. 10I, the sample and hold signal SH is formed as a signal which samples and holds during the period in which the rotary head HA scans the area AP2, only the latter half thereof is not affected by the erase signal noise. It samples and holds during the whole period in which the rotary head HB scans the area AP2.

In FIG. 10, FIG. 10B illustrates the signal RFSW1, FIG. 10C the signal RFSW4, FIG. 10D the area signal PA4, FIG. 10E the PCM signal to be recorded in the area AP4, and FIG. 10F the recording and reproducing switching signal R/P from the system controller 10.

In the above mentioned embodiments, the recording areas are determined in the sequential order of AP2, AP6, AP5, . . . , by the system controller 10, and the sample and hold signal used to obtain the tracking error signal is generated for the area from which the reproduced signal can be reproduced in response thereto. It may be possible that the initial recording area is determined, for example, as AP2 and the tracking servo of all other areas in the recording mode is carried out by using only the reproduced pilot signal from this area AP2.

This invention is not limited to the multi-PCM mode of the 8 mm video tape recorder, but can be applied to all recording and/or reproducing apparatus arranged as a system in which the recording track is divided along the scanning direction of the rotary head. The recording and/or reproducing can be carried out at each of the divided areas, and the pilot signal for tracking can be recorded on each track under the condition that it is superimposed upon the information signal.

According to the present invention as set forth above, while the tracking servo is being carried out by using the pilot signal reproduced from the divided track area on which the recording was already made, the recording is carried out on other divided track areas so that the divided tracks can be aligned rectilineally along the scanning direction of the rotary head.

Although various minor changes and modifications might be suggested by those skilled in the art, it will be understood that we wish to include within the claims of the patent warranted hereon all such changes and modifications as reasonably come within our contribution to the art.

We claim as out invention:

1. A method for recording at least first and second PCM digital audio signals at respective first and second equal length areas on a plurality of succeeding slant tracks on a recording medium scanned by a rotary head, and wherein for a given track a same pilot signal is mixed in with each of the first and second information signals at the first and second areas on the given track, comprising the steps of: providing a pilot signal generator for generating at least first, second, third, and fourth pilot signals each having a different frequency;

recording in the first area of each of the plurality of succeeding slant tracks the first PCM digital audio signal such that for each group of four succeeding slant tracks a successively different one of said first through fourth pilot signals is mixed in with the first PCM digital audio signal;

playing back one of the slant tracks so as to reproduce the first PCM digital audio signal at the first area thereof, and using crosstalk pilot signals received from adjacent tracks when scanning the one track to generate a tracking error signal which is used for tracking during playback of the first area of said one track being played back, and sampling and holding said tracking error signal; and subsequently recording said second PCM digital audio signal at said second area of the same one track having a length equal to that of the first area and also mixing in and recording with the second PCM digital audio signal the same pilot signal present in said first area of the same one track, and controlling a tracking during said recording of said second area on the one track by using said sampled and held tracking error signal derived during playback of said first area so that the first and second equal length areas are aligned with one another along said one track.

2. A method according to claim 1 wherein when playing back the one slant track to reproduce the first PCM digital audio signal the tracking error signal is generated by using the crosstalk pilot signals and one of the pilot signals from the pilot signal generating circuit.

3. A method according to claim 1 wherein third through sixth PCM digital audio signals are also recorded and aligned with one another at third through sixth areas all having a same length on the same one slant track and with the same pilot signal being mixed in with all six information signals on the same one track.

4. A digital audio apparatus for recording at least first and second PCM digital audio signals at respective first and second equal length areas on a plurality of succeeding slant tracks on a recording medium scanned by a rotary head, and wherein for a given track a same pilot signal is mixed in with each of the first and second PCM digital audio signals at the first and second areas on the given track, comprising:

pilot signal generator means for generating at least first, second, third, and fourth pilot signals each having a different frequency;

means for recording in the first area of each of the plurality of succeeding slant tracks the first PCM digital audio signal such that for each group of four succeeding slant tracks a successively different one of said first through fourth pilot signals is mixed in with the first PCM digital audio signal;

means for playing back one of the slant tracks so as to reproduce the first PCM digital audio signal at the first area thereof and using crosstalk pilot signals received from adjacent tracks when scanning the one track to generate a tracking error signal which is used for tracking during playback of the first area of said one track being played back, and sampling and holding said tracking error signal; and means for subsequently recording said second PCM digital audio signal at said second area of equal length as said first area of the same one track and also mixing in and recording with the second PCM digital audio signal the same pilot signal present in said first area of the same one track, and controlling a tracking during said recording of said second area on the one track by using said sampled and held tracking error signal derived during playback of said first area so that the first and second areas are aligned with one another along said one track.

* * * * *